United States Patent [19]
Rothermel et al.

[11] Patent Number: 5,608,460
[45] Date of Patent: Mar. 4, 1997

[54] SYNCHRONIZING SIGNAL SEPARATING CIRCUIT WITH CONTROLLED FLYWHEEL STAGE

[75] Inventors: Albrecht Rothermel; Carlos Correa, both of Villingen-Schwenningen, Germany

[73] Assignee: Deutsche Thomson-Brandt GmbH, Villingen-Schwenningen, Germany

[21] Appl. No.: 323,963

[22] Filed: Oct. 17, 1994

[30] Foreign Application Priority Data

Oct. 15, 1993 [DE] Germany .......... 43 35 197.2

[51] Int. Cl.$^6$ ................................... H04N 5/08
[52] U.S. Cl. ........................... 348/525; 348/533
[58] Field of Search ................. 348/500, 521, 348/524, 543, 553, 537, 194, 525, 540, 536, 497, 533; 315/371, 387, 395, 370, 399; H04N 5/04, 9/44, 5/08

[56] References Cited

U.S. PATENT DOCUMENTS

| 4,667,232 | 5/1987 | Long | 348/534 |
| 5,251,032 | 10/1993 | Heerkens | 348/500 |

FOREIGN PATENT DOCUMENTS

| 3715913 | 11/1988 | Germany . |
| 788437 | 12/1980 | U.S.S.R. . |

Primary Examiner—Victor R. Kostak
Attorney, Agent, or Firm—Joseph S. Tripoli; Joseph J. Laks; Harvey D. Fried

[57] ABSTRACT

A synchronizing signal separating circuit for a television receiver, comprising: a source of a video signal having a line synchronizing signal component; a line synchronizing signal component separator having an amplitude selective stage and having a flywheel stage imparting a response time constant to the separator which enhances noise immunity; a delay circuit for the video signal, for example a multiple line delay, coupled ,between the video signal source and the separator; a control circuit coupled to the video signal source and evaluating the time positions of line synchronizing pulses of a plurality of successive lines to identify a kind of line phase disturbance in which the line phase of an entire raster is displaced, the control circuit supplying a control signal to the separator indicative of the kind of phase disturbance; and, the flywheel stage being temporarily rendered inoperative responsive to the control signal, for example by temporarily decreasing the response time of the separator, upon identification of the kind of line phase disturbance in which the line phase of an entire raster is displaced. The control circuit may comprise: a second line synchronizing signal component separator; a phase comparator; a digital memory for phase deviations determined by the phase comparator; and, a counter for phase deviatons which generates the control signal upon reaching a predetermined number of phase deviations.

14 Claims, 2 Drawing Sheets

200
SYNCHRONIZING SIGNAL SEPARATING CIRCUIT WITH CONTROLLED FLYWHEEL STAGE

BACKGROUND OF THE INVENTION

1. Field of the Invention

The invention relates to the field of synchronizing signal separating circuits for television receivers.

2. Description of Related Art

In a television receiver, the line deflection circuit is provided with a high time constant in order to compensate for disturbances in the form of missing or temporarily wrongly phased line synchronizing pulses. A high time constant of this type is possible because the line synchronizing pulses coming from the transmitter are practically constant, with a high degree of accuracy in phase and frequency, and phase displacements in the line raster practically never occur.

In practice however, video signals having appreciable variations is in frequency and in the phasing of the line raster are also supplied to the television receiver. This is particularly the case when the video signal is delivered by a video recorder because the line frequency and the phasing of the line raster are then no longer constant, due to fluctuations in speed, stretching of the tape and other such effects. In particular, sudden alterations in the phasing of the line raster occur when the scanning video head runs at an angle across a plurality of adjacent tracks during a search process in a video recorder. If the time constant of the line deflection means in the television receiver then has the high value, the line deflection means cannot follow the new phase quickly enough and there will be geometrical distortions in the reproduced image. It is then necessary, and known, to switch the time constant in the line synchronizing means to a lower value for such a signal.

The sought after high degree of immunity to disturbance thus leads to a high time constant, while a signal having line pulses fluctuating in frequency or phase requires a smaller time constant. Consequently, a compromise is required as regards the dimensioning of the line deflection circuit in order to satisfactorily meet the two demands.

Known separating circuits can contain an amplitude selective stage and a flywheel stage which serves for suppressing disturbances. An adequate suppression of disturbance requires a flywheel stage which introduces a relatively high time constant in order to exclude the influence of missing individual synchronizing pulses or synchronizing pulses which are wrongly located in time. However, a rapid adaptation to alterations in frequency and phase of the line synchronizing pulses, for a signal from a video recorder for example, requires a small time constant. In practice, a compromise has to be struck between these two contrasting requirements or the time constants are switched in dependence on the type of signal.

SUMMARY OF THE INVENTION

The object of the invention is to construct a synchronizing signal separating circuit such that no unsatisfactory compromise is needed, but rather, that the requirements in respect of a high time constant for immunity to disturbance and a low time constant for adapting to signals having frequency and phase errors are fulfilled to is the same extent.

In accordance with this object, an inventive arrangement may comprise a flywheel stage which serves for suppressing disturbances but which nevertheless rapidly adapts to alterations in frequency and phase of the supplied line synchronizing pulses.

The video signal is supplied to two processing paths, one having a delay circuit and the other having a control circuit. The video signal is supplied to the control circuit, which generates a control signal by evaluating the time position of line synchronizing pulses from a plurality of successive lines. If, at the beginning of a phase disturbance, a plurality of successive line synchronizing pulses are displaced in phase with respect to the previous line raster, the flywheel stage of the separating stage is temporarily made inoperative so that the separating stage can rapidly adapt to the new phase.

A synchronizing signal separating circuit for a television receiver, in accordance with this object, comprises: a source of a video signal having a line synchronizing signal component; a line synchronizing signal component separator having an amplitude selective stage and having a flywheel stage imparting a response time constant to the separator which enhances noise immunity; a delay circuit for the video signal, coupled between the video signal source and the separator; a control circuit coupled to the video signal source and evaluating the time positions of line synchronizing pulses of a plurality of successive lines to identify a kind of line phase disturbance in which the line phase of an entire raster is displaced, the control circuit supplying a control signal to the separator indicative of the kind of phase disturbance; and, the flywheel stage being temporarily rendered inoperative responsive to the control signal upon identification of the kind of line phase disturbance in which the line phase of an entire raster is displaced.

The delay stage may be a digital memory which imparts a delay corresponding to a plurality of line periods. The flywheel stage may temporarily rendered inoperative by temporarily decreasing the response time of the separator. The control circuit may comprise: a second line synchronizing signal component separator for the video signal, having a second flywheel stage; a phase comparator; a digital memory for phase deviations determined by the phase comparator, data identifying the number, magnitude and direction of each determination being stored in the memory and, a counter connected to the phase comparator, which counts the number of phase deviations between the line synchronizing pulses of the successive lines and generates the control signal upon reaching a predetermined count of the phase deviations.

Thus, with the solution in accordance with the invention, the structure of the supplied video signal is initially investigated in the control circuit. Thereby, there are three particular states. The line synchronizing pulses may exhibit absolutely constant frequency and phase as for a transmitted signal, i.e. there are no disturbances in the time raster. In a second case, just one line synchronizing pulse for example is displaced in phase within the line raster, or, is completely missing, while the line raster is not disturbed. In a third case, the whole line raster is displaced in phase by one time unit with respect to the previous line raster as from the beginning of the disturbance whereby the frequency may continue to be the same. In the first case and the second case, the control circuit does not have any affect on the synchronizing signal separating circuit which is provided with a flywheel stage. In these two cases, there is only a temporary disturbance which is compensated for by the flywheel stage which continues to run unchanged. In the third case however, it is desired, and necessary, that the separating circuit is set as quickly as possible to the new phasing of the raster. Initially however, this is not possible for the effective flywheel stage which exhibits the high time constant. Consequently, in the third case, the flywheel stage is deliberately temporarily switched off, a time constant being substantially reduced for example. The separating circuit can then be set, in the desired manner, to the new phasing of the line raster with practically no response time. As soon as this has occurred, the flywheel stage is re-activated after a few lines or within one line i.e. the effective time constant is increased again so that the wanted immunity to disturbance is once more provided in the desired manner.

The measure, namely the rendering inoperative of the flywheel stage, should, in so far as possible, occur immediately at the beginning of the disturbance, with the jump in the phase angle of the line synchronizing pulses for example. On the other hand however, the control circuit needs a plurality of lines in order to investigate the structure of the line synchronizing pulses. Thus, in a manner of speaking, the circuit has "to be able to see into the future" in order to carry out, without any delay, an action whose necessity is not actually perceived until some time later. In order to make this possible, the delivered video signal is supplied to the separating stage via a delay stage of several lines. It is thereby possible to institute the action, which is only perceived to be necessary several lines after the beginning of the disturbance, right at the beginning of the disturbance.

Thus, with the solution in accordance with the invention, the advantage of the flywheel stage having the large time constant for suppressing disturbances is combined with the advantages of the small time constant for adapting to a fluctuating signal in that the circuit automatically adapts itself to the current structure of the signal. For a transmitter signal which is not interfered with in any way, or a signal subject to only a short term disturbance during just one line, the flywheel stage and the high time constant remain effective. For a signal including a disturbance in the form of a sudden displacement in the phasing of the line raster however, the flywheel stage is automatically de-activated and thus the wanted small time constant becomes temporarily effective.

DETAILED DESCRIPTION OF THE PREFERRED EMBODIMENTS

Figure 1:
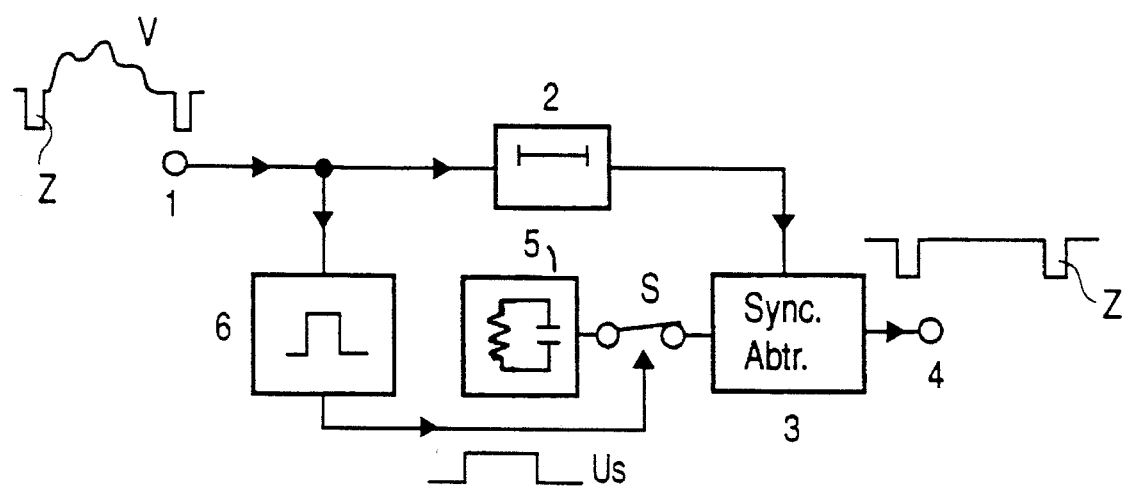
FIG. 1 is a simplified block circuit diagram of the solution in accordance with the invention.

In FIG. 1, the proffered video signal V including the line synchronizing pulses Z, which may be coming from a television transmitter, a video recorder or some other signal source, is supplied from the terminal 1 via the delay stage 2 having a delay time in the order of magnitude of three lines to the synchronizing signal separating stage 3 which delivers the separated line synchronizing pulses Z at its output 4. The flywheel stage 5, which is illustrated symbolically by means of an oscillatory circuit, is associated with the separating stage 3. The flywheel stage 5 produces a high time constant in the separating stage 3 which, for example, is such that the failure or a temporarily altered phase angle of just one line synchronizing pulse is suppressed. Moreover, the video signal V reaches the control circuit 6 which investigates the time sequence of the phasing of the line synchronizing pulses.

Figure 2:
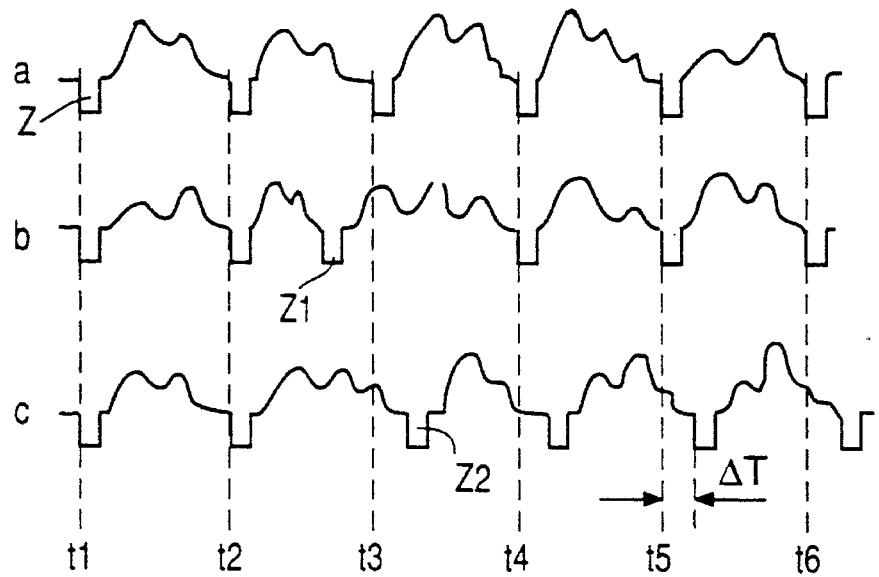
FIG. 2 shows curves useful for explaining the manner of operation of the circuit in accordance with FIG. 1.

The manner of operation of the circuit in accordance with FIG. 1 will be explained for two extreme cases with the aid of FIG. 2. FIG. 2a depicts a video signal V that is not subject to disturbance and which has a constant separation in time between the line synchronizing pulses Z without any frequency and phase errors. With a signal of this type, the control circuit 6 does not have any affect on the separating stage 3, 5 i.e. the flywheel stage 5 remains connected via the closed switch S. In accordance with FIG. 2b, only the line synchronizing pulse Z1 has an incorrect phase angle during the line between the time points t2 and t3, while the line synchronizing pulses at t4, t5, t6 etc. in the succeeding lines again have a phase angle which is not subject to disturbance. Likewise in this case, the control circuit 6 does not have any affect on the separating circuit 3, 5. Thus, the incorrect phase angle of Z1 is suppressed by the effect of the flywheel stage 5 in the stage 3 and does not appear at the output 4. In accordance with FIG. 2c, there is a phase jump at the position of the line synchronizing pulse Z between t2 and t4 caused for example, by the scanned video head in a video recorder running from one helical track onto an adjacent helical track. Beginning with the line synchronizing pulse Z2, the phasing of the line raster is thus suddenly altered with respect to the phasing of the line raster in accordance with FIG. 2a but remains unchanged thereafter. For this case in accordance with FIG. 2c, the control circuit 6 generates a control signal Us. Us opens the symbolic switch S and thereby separates the flywheel stage 5 from the separating stage 3. The otherwise effective large time constant of the separating stage 3 is preferably switched to a substantially smaller value. Due to the separation or decoupling of the flywheel stage 5, the separating stage 3 can now be very quickly set, approximately in the region of the time point t4, to the newly altered phase angle of the line synchronizing pulses in accordance with FIG. 2c as from t4. Shortly thereafter, e.g. two to three lines after the beginning of the disturbance, the switch S is re-closed by the control signal Us and consequently the flywheel stage 5 is coupled-in again and the time constant raised once more.

Figure 3:
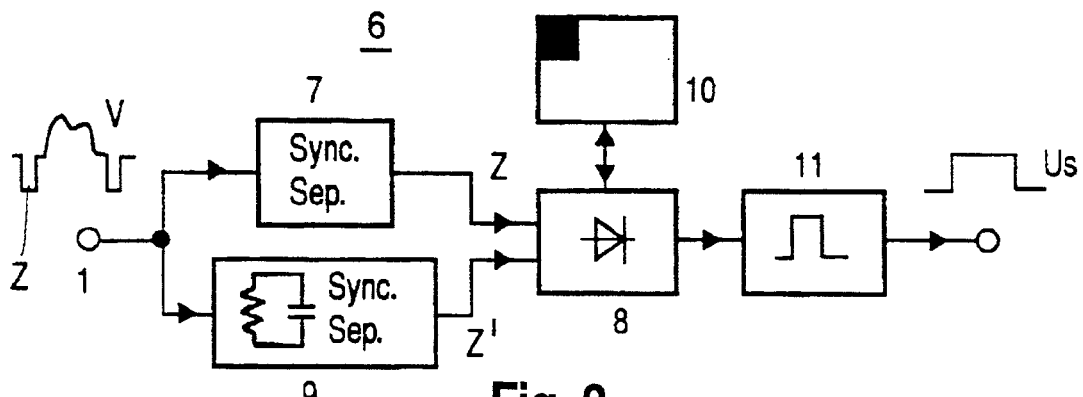
FIG. 3 is a block circuit diagram for one embodiment of the control circuit.

FIG. 3 shows a block circuit diagram for the implementation of the control circuit 6. The video signal V arrives from the terminal 1 at the synchronizing signal separating stage 7 which operates without a flywheel stage, i.e. with practically no time constant, and only separates the line synchronizing pulses Z from the video signal amplitude selectively. The separated line synchronizing pulses Z, which thus exactly correspond in time with the line synchronizing pulses Z of the video signal at the terminal 1, then reach the phase comparison stage 8. Moreover, the video signal V is fed to the second synchronizing signal separating stage 9. This, however, always operates with the flywheel stage indicated by the oscillatory circuit i.e. with a high time constant. The line synchronizing pulses Z' at the output of the stage 9 thus do not follow sudden alterations in the time position of the supplied line synchronizing pulses. The time position between the line synchronizing pulses Z and Z' is now compared in the phase comparison stage 8. Each deviation in phase between Z and Z' i.e. between the line synchronizing pulse Z2 of the delivered video signal V and the corresponding line synchronizing pulse coming from the separating stage 9 at t3 in accordance with FIG. 2 for example, is detected in the phase comparison stage 8 and supplied to the connected store 10. The store 10 now stores the results of the phase deviation according to magnitude, direction and number. As soon as a phase deviation has been detected in a plurality of successive lines, i.e. the state in accordance with FIG. 2c is detected, the control signal Us, which induces the decoupling of the flywheel stage 5 in accordance with FIGS. 1, 2 in the manner described, is generated via the pulse stage 11. Us is generated for example, when a phase deviation of the line synchronizing pulses with respect to the preceding raster is detected over three successive lines.

FIG. 4 shows different shapes of vertical lines illustrated on the picture screen for a signal from a video recorder.

Figures 4A, 4B, 4C, 4D:
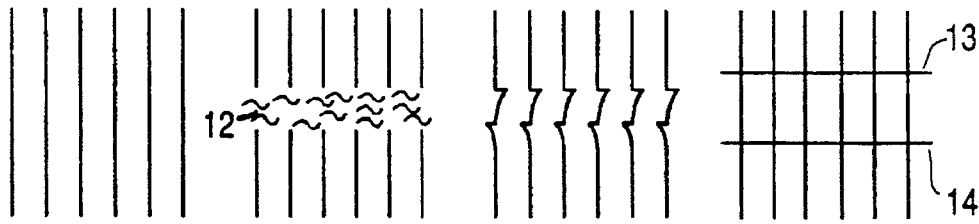
FIG. 4 shows diagrams useful for explaining the effects of phase disturbances to the line deflection means.

FIG. 4a shows the normal reproduction process without any errors worth mentioning in the signal. The vertical lines in the picture are then free from distortion.

FIG. 4b shows the state for a search process. Due to the scanning heads successively running over adjacent tracks and also reaching tracks which do not have a matching azimuth angle, there is a disturbed zone 12 in the form of a noise bar in the middle of the image.

FIG. 4c shows the same thing for a video recorder in which it is ensured that a scanning always occurs with the correct azimuth angle by switching over a plurality of heads. A loss of signal then no longer occurs and the disturbance bar 12 in accordance with FIG. 4b is avoided. However, due to the heads successively running over different tracks and the occurrence of a switching between different heads, there is a phase jump of the line synchronizing pulses Z. If the line deflection circuit cannot follow this jump in phase quickly enough, then there are distortions in accordance with FIG. 4c in the form of a chipping of the vertical lines.

FIG. 4d depicts the case including the described decoupling of the flywheel stage. Since the cause for the distortion in accordance with FIG. 4c is appreciated and the effect is counteracted in good time by decoupling the flywheel stage, there is only a short disturbance in the course of one or a plurality of lines as is indicated by lines 13, 14. The distortion in accordance with FIG. 4c, which results from too high a time constant, is avoided.

Figure 5:
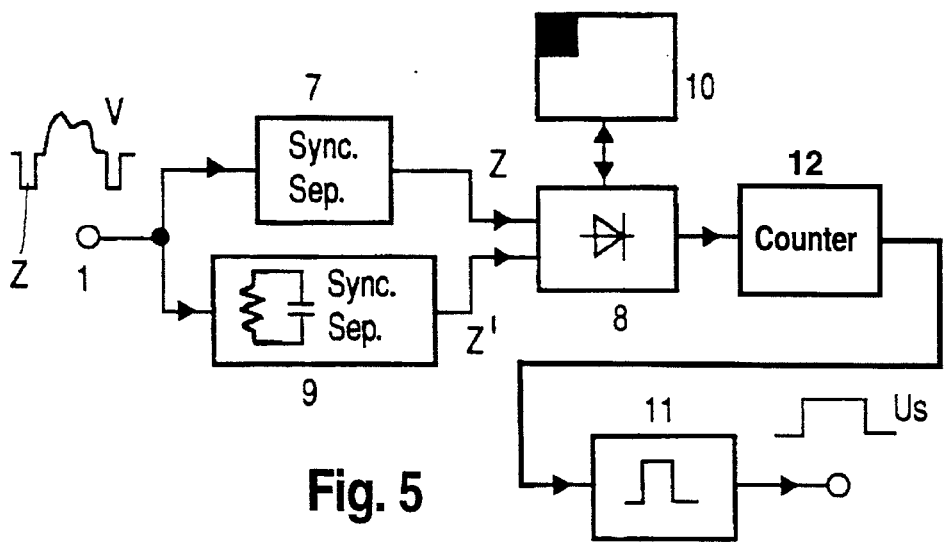
FIG. 5 is a block diagram for another embodiment of the control circuit.

FIG. 5 shows a block circuit diagram which is identical to FIG. 3, except for further including a counter 12. Counter 12 is connected to the phase comparison stage 8 and counts the number of phase deviations between the line synchronizing pulses of the successive lines. The control signal is generated when a predetermined count of phase deviations has been reached.

What is claimed is:

1. A synchronizing signal separating circuit for a television receiver, said separating circuit comprising:

a source of a video signal having a line synchronizing signal component;

a line synchronizing signal component separator having an amplitude selective stage and having a flywheel stage imparting a response time constant to said separator which enhances noise immunity;

a delay circuit for said video signal, coupled between said video signal source and said separator;

a control circuit coupled to said video signal source and evaluating the time positions of line synchronizing pulses of a plurality of successive lines to identify a kind of line phase disturbance in which the line phase of an entire raster is displaced, said control circuit supplying a control signal to said separator indicative of said kind of line phase disturbance; and, said flywheel stage being temporarily decoupled responsive to said control signal upon identification of said kind of line phase disturbance in which the line phase of an entire raster is displaced.

2. A circuit according to claim 1, wherein said delay circuit imparts a delay corresponding to a plurality of line periods.

3. A circuit according to claim 1, wherein said delay circuit comprises a digital memory.

4. A circuit according to claim 1, wherein said flywheel stage is temporarily decoupled by temporarily decreasing said response time of said separator.

5. A circuit according to claim 1, wherein said control circuit comprises:

a second line synchronizing signal component separator for said video signal, having a second flywheel stage; and, a phase comparator.

6. A circuit according to claim 5, further comprising a digital memory for phase deviations determined by said phase comparator, data identifying the number, magnitude and direction of each said determination being stored in said memory.

7. A circuit according to claim 5, further comprising a counter connected to said phase comparator, which counts the number of phase deviations between the line synchronizing pulses of said successive lines and generates said control signal upon reaching a predetermined count of said phase deviations.

8. A synchronizing signal separating circuit for a television receiver including an amplitude selective stage and a flywheel stage which introduces a response time into the separation that serves for suppressing disturbances, comprising:

a delay circuit located in the path of the video signal to the separating stage; and, a control circuit to which the video signal is applied prior to a the delay circuit, the control circuit generating a control signal for distinguishing between the following first and second cases of disturbance by evaluating the time positions of line synchronizing pulses of a plurality of successive lines:

just one line synchronizing pulse is missing within the line raster, or, the just one line synchronizing pulse has an incorrect time position, and the following line synchronizing pulses are then correct once more with respect to the line raster; or, just one line synchronizing pulse is missing within the line raster, or, the just one line synchronizing pulse has an incorrect time position, and the whole line raster following is displaced by one time unit, the control signal temporarily decoupling the flywheel stage in the second case of disturbance in which the whole line raster following is displaced by one time unit.

9. A circuit in accordance with claim 8, wherein the delay circuit provides a delay time corresponding to a plurality of line periods.

10. A circuit in accordance with claim 8, wherein the delay circuit comprises a digital store.

11. A circuit in accordance with claim 8, wherein the decoupling of the flywheel stage is effected by reducing a time constant which is effective in the separating stage.

12. A circuit in accordance with claim 8, wherein the control circuit comprises a second separating stage, which incorporates a second flywheel stage and is controlled by the video signal, and a phase comparison stage which evaluates the time position between supplied line synchronizing pulses and line synchronizing pulses generated therefrom in the second separating stage and generates the control signal therefrom.

13. A circuit in accordance with claim 12, further comprising a digital store coupled to the phase comparison stage, the digital store holding the phase deviations that have been determined in terms of number, magnitude and direction.

14. A circuit in accordance with claim 12, further comprising a counter coupled to the output of the phase comparison stage, the counter counting the phase deviations between the line synchronizing pulses in the successive lines that have been determined in the phase comparison stage and generating the control signal upon reaching a predetermined counter state.

* * * * *